E. ZYSSET.
CULINARY UTENSIL COVER.
APPLICATION FILED APR. 12, 1911.

1,013,263.

Patented Jan. 2, 1912.

Witnesses
R. Dommers
Elizabeth Leckert

Inventor
Ernst Zysset
by Henry Orth Atty

UNITED STATES PATENT OFFICE.

ERNST ZYSSET, OF WÄDENSWIL, SWITZERLAND.

CULINARY-UTENSIL COVER.

1,013,263.  Specification of Letters Patent.  Patented Jan. 2, 1912.

Application filed April 12, 1911. Serial No. 620,693.

*To all whom it may concern:*

Be it known that I, ERNST ZYSSET, a citizen of the Republic of Switzerland, residing at Wädenswil, Switzerland, have invented certain new and useful Improvements in Culinary-Utensil Covers; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to covers or tops for culinary or other utensils, and has for its object to provide a so-called universal cover containing a water jacket whereby the contents of the vessel may be kept heated after the cooking operation has finished, or it may be utilized as an auxiliary vessel for the heating of water.

Figure 1:
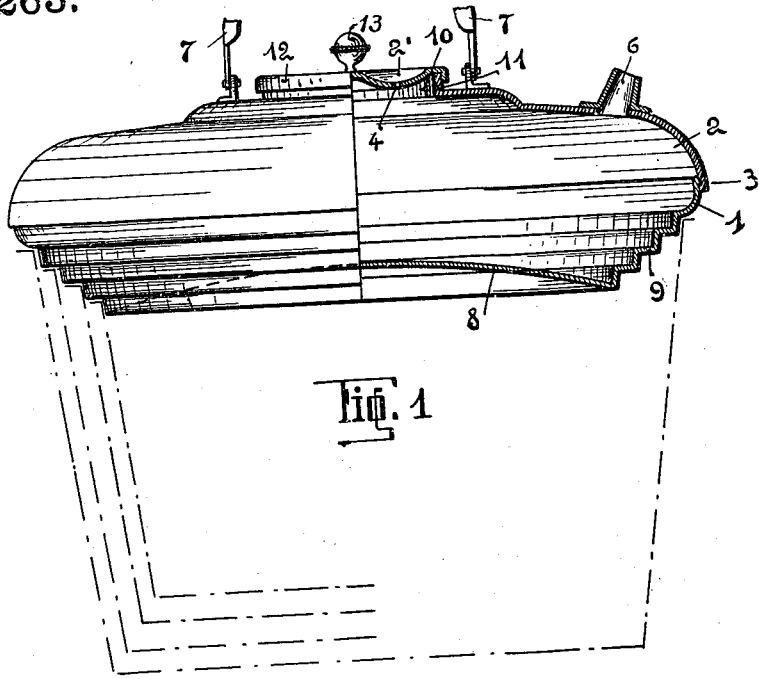
Figure 2:
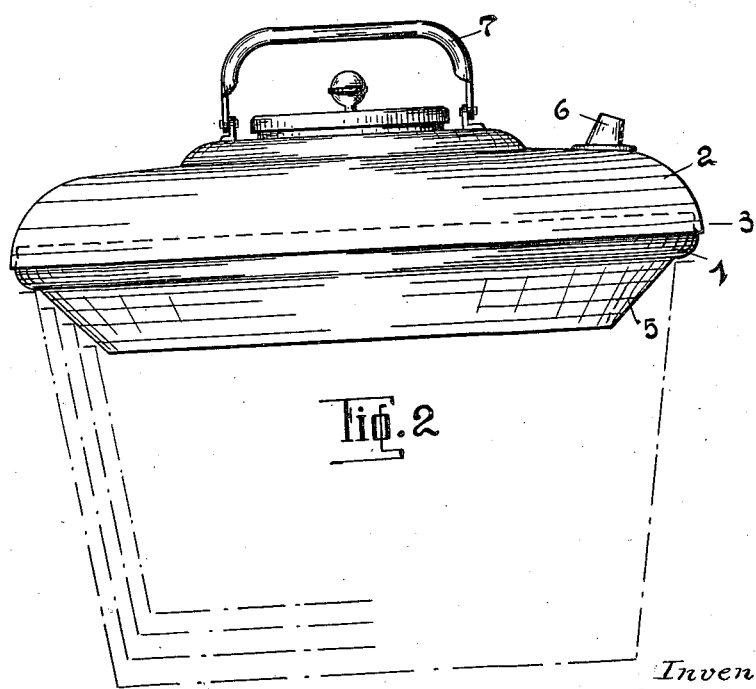

Referring to the drawing in which like parts are similarly designated, Figure 1 is a view partly in section and partly in elevation of such a cover. Fig. 2 is an elevation of a modification thereof.

Referring more particularly to Fig. 1, the cover or top comprises a bottom member 1, and a top member 2, both preferably, but not necessarily, made of sheet metal and connected together by a suitable water-tight seam or joint 3 which may be soldered if desired. The bottom member has an arched bottom 8 conical stepped sides 9, these stepped sides permitting the cover to be used on vessels of diameters corresponding to the diameters of the various conical steps in the sides 9. The top member 2 is provided with an opening 10 surrounded by an upturned flange 11, and on this flange seats a lid 12, provided with a handle or knob 13 and a depression 2' having a perforation or hole 4 in its bottom. The top member is also provided with a spout 6 and a pivoted handle 7 as shown. By removing the lid 12 the interior of the cover can be readily cleaned while the opening 4 and spout 6 permit the ready escape of steam, if any is formed. When it is desired to add water to the cover from time to time, it will simply be necessary to pour the same into the depression 2' and it will run through the perforation 4.

In the modification shown in Fig. 2 the bottom member is formed as a plain cone 5 instead of stepped as at 9, Fig. 1, while in other particulars, the structure is the same as that shown in Fig. 1.

I claim:

1. A hollow cover for utensils, comprising a sheet metal upper member and a sheet metal lower member, having a soldered joint between them, said upper member provided with a handle, an opening between the ends of the handle, a removable dished cover for said opening having a perforation within the dished portion, and a spout on said upper member.

2. A hollow cover for utensils, comprising a circular sheet metal upper member, and a circular sheet metal lower member, having a water-tight joint between them, said upper member provided with a central opening, a removable dished cover for said opening, a handle extending over the opening, a spout in the top of the upper member, said lower member having an arched bottom and conical stepped sides.

In testimony that I claim the foregoing as my invention, I have signed my name in presence of two subscribing witnesses.

ERNST ZYSSET.

Witnesses:
 ARTHUR J. BUNDY,
 KARL BAUTLE.